United States Patent
Sponer

[11] Patent Number: 5,961,161
[45] Date of Patent: Oct. 5, 1999

[54] PIPE CONNECTOR CLAMP

[75] Inventor: Wolfgang Sponer, Vienna, Austria

[73] Assignee: Mage AG, Courtaman, Switzerland

[21] Appl. No.: 09/041,782

[22] Filed: Mar. 13, 1998

[51] Int. Cl.⁶ ..................................................... F16L 17/02
[52] U.S. Cl. ............................. 285/373; 285/382; 24/279
[58] Field of Search .................................. 285/367, 410, 285/411, 382, 253, 373, 419; 24/279, 280, 281, 282, 283, 284, 286

[56] References Cited

U.S. PATENT DOCUMENTS

| 2,541,205 | 2/1951 | Christiphersen | 285/410 |
| 4,195,303 | 3/1980 | Henning | 24/279 X |
| 4,795,199 | 1/1989 | Gehring | 285/367 X |

FOREIGN PATENT DOCUMENTS

| 0057373 | 8/1982 | European Pat. Off. . | |
| 0186728 | 7/1986 | European Pat. Off. . | |
| 0193087 | 9/1986 | European Pat. Off. . | |
| 1138312 | 6/1957 | France | 24/279 |
| 842739 | 6/1952 | Germany . | |
| 583719 | 12/1946 | United Kingdom | 24/279 |

*Primary Examiner*—Dave W. Arola
*Attorney, Agent, or Firm*—Paul Vincent

[57] ABSTRACT

A pipe connector clamp 10 for connecting two pipes having smooth ends has a metal jacket 11 comprising a tightening angle 15, 16 at a separation line of the metal jacket 11 disposed along its girth. The tightening angles 15, 16 are supported from below by reinforcement angles 17, 18. A press rivet nut 20 or a press rivet ring 19 hold the tightening angle 15, 16 and the reinforcement angle 17, 18 together by riveting the tightening angle 15, 16 and the reinforcement angle 17, 18 to the press rivet nut 20 or the press rivet ring 19. The riveted mounting of the press rivet nut 20 or the press rivet ring 19 facilitates simplified manufacture of the pipe connector clamp 10.

10 Claims, 3 Drawing Sheets

PIPE CONNECTOR CLAMP

BACKGROUND OF THE INVENTION

The invention concerns a pipe connector clamp for connecting two pipes having smooth ends, consisting essentially of a metal jacket and an elastomer seal.

The elastomer seal is inserted into the metal jacket and the metal jacket can be flat or contoured. The metal jacket is split at least once transverse to the peripheral direction (separation line) and is pulled together at that location with the assistance of one or more tightening bolts in such a fashion that the elastomer seal is firmly pressed against the pipes to be connected in order to join the pipes in a fluid-sealing fashion.

It is the purpose of the invention to improve conventional pipe connector clamps in such a fashion that the spacer ring and the bolt nuts, which hold the tightening bolts, are incorporated in the pipe connector clamp in a simplified and nevertheless improved fashion.

SUMMARY OF THE INVENTION

This purpose is achieved in accordance with the invention in that tightening angles, bent in a radially outward direction, are disposed at the one or plurality of peripherally located separation lines of the metal jacket and press rivet nuts and press rivet rings are mounted to the tightening angles.

The configuration of the pipe connector clamp in accordance with the invention has the substantial advantage that, through utilization of press rivet nuts and press rivet rings, a particularly economical manufacture of the pipe connector clamp is possible. The press rivet nuts and press rivet rings can be pressed onto the tightening angle without additional preparation work. Both the press rivet nut and the press rivet ring thereby penetrate through the material thickness of the tightening angle to rivet the press rivet nut and press rivet ring to the corresponding tightening angle. A prestamping of holes on the tightening angles is not necessary. By means of the axial length and constructional height of the press rivet nuts or press rivet rings, a good guiding of the tightening bolts is achieved and the tightening angle remains substantially free of bending forces.

In a further embodiment of the invention, the tightening angles are secured with respect to bending by one or by a plurality of reinforcement angles. This has the advantage that undesirable deformation of the pipe connector clamp by increased tensile or compressional forces can be compensated for in the region of the tightening angle. Positioning of the reinforcement angles over or under the tightening angles reliably secures the tightening angles with respect to undesirable deformation. Clearly, the tightening angle must not necessarily be bent out of the metal jacket itself. The tightening angles can be disposed on the metal jacket as components separate from the metal jacket or attached to a section about the inner girth of the metal jacket. The tightening angles and the reinforcement angles support the press rivet nut or press rivet ring, which can be pulled towards each other by means of tightening bolts. The reinforcement angle is, in an embodiment, integrally connected with the metal jacket or with the tightening angle.

In an additional embodiment, the tightening angles and the reinforcement angles are held together by means of the press rivet nuts or the press rivet rings.

In a preferred embodiment, a connecting bridge is disposed between the separation line or separation lines, with the connecting bridge having an edge section disposed between the tightening angles and extending diagonally in the outward direction radially towards the pipe axis whose height tapers down to zero or approximately down to zero along that section of the connecting bridge which slides below an edge of the oppositely lying portion of the metal jacket when the tightening bolt or tightening bolts are tightened.

The connecting bridge spans the distance between two radially outwardly bent tightening angles and covers an elastomer ring seated in the metal jacket in the outward direction so that, during tightening of the pipe connector clamp, the elastomer ring is not pushed out in a radial direction. In the event that the edge sections on the connecting bridge are confined to a certain section, redundant use of material is avoided and, when tightening the pipe connector clamp in accordance with the invention, the connecting bridge slides with its edge sections or with its tapered edge sections below the oppositely lying portion of the metal jacket.

Similar to the reinforcement angle or the tightening angle, the connecting bridge can be welded, glued, riveted or clamped to the metal jacket at an end section. Attachment of the connecting bridge to the metal jacket is necessary in order for the connecting bridge to be properly directed towards or aligned with the oppositely lying side of the metal jacket.

The connecting bridge has cuts extending over a portion of its length. These have the advantage of exhibiting a higher degree of flexibility compared to that of the metal jacket. When the pipe connector is clamped, the connecting bridges can adjust with differing shapes as the cuts (longitudinal slots) widen or narrow. In addition, crimps are provided for on the connecting bridge which extend in a peripheral direction. The crimps stiffen individual sections of the connecting bridge.

In a preferred improvement of the invention, the press rivet nuts or the press rivet rings have a size which is suitable for guiding the tightening bolts in such a fashion that the tightening angles do not bend in a forward direction. This type of configuration of the press rivet nuts or the press rivet rings effects an additional stabilization of the pipe connector clamp in accordance with the invention in the region of the tightening angle.

In another embodiment of the pipe connector clamp in accordance with the invention, the reinforcement angle and the connecting bridge are connected to the girth of the metal jacket by means of only one weldment. This has the advantage that both the reinforcement angle as well as the connecting bridge can be attached in a sufficiently stable fashion to the metal jacket in one processing step.

Additional advantages can be extracted from the description of the accompanying drawing. The above mentioned features and those to be further described below can be utilized in accordance with the invention either individually or collectively in arbitrary combination. The embodiments described are not to be considered as exhaustive enumeration, rather have exemplary character only. The invention is represented in the drawing.

BRIEF DESCRIPTION OF THE DRAWING

FIG. 5b shows a side view of the reinforcement angle in accordance with FIG. 5a;

FIG. 6b shows a plan view of the connecting bridge in accordance with FIG. 6a.

DESCRIPTION OF THE PREFERRED EMBODIMENT

Figure 1:
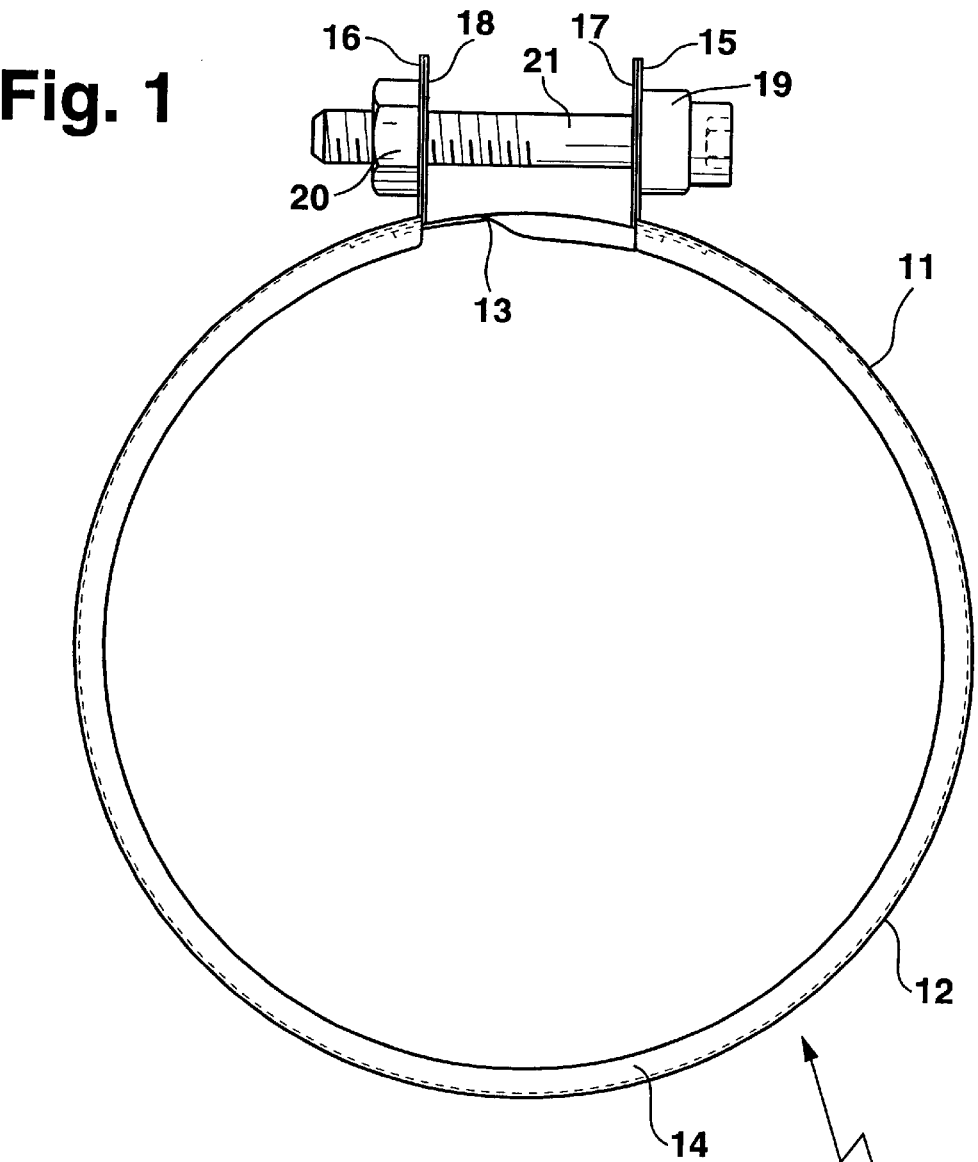
FIG. 1 shows an over-all view of a pipe connector clamp in accordance with the invention.

FIG. 1 indicates, with reference symbol 10, a pipe connector clamp for connecting two pipes having smooth ends. The pipe connector clamp 10 consists essentially of a contoured or non-contoured metal jacket 11 which is separated transverse to the peripheral direction at at least one location about its girth.

A contour 12 is indicated in FIG. 1 using dotted lines along girth of the pipe connector clamp 10. The metal jacket 11 has a connecting bridge 13 in the separated region which is mounted to an end of the metal jacket 11, e.g. by means of a weldment.

The metal jacket 11 has edges 14 along both sides of its girth extending outwardly in the vertical or diagonal direction towards the pipe axis to prevent a crushing and/or spreading out of a rubber seal disposed between metal jacket 11 and the outer walls of the pipe. Further peripherally travelling depressed or protruding crimps can also be configured on metal jacket 11 to increase the stiffness of the connected pipes.

The separated region of the pipe connector clamp 10 has tightening angles 15, 16 bent on the metal jacket 11. The tightening angles 15, 16 are supported by means of reinforcement angles 17, 18 which are connected by means of a press rivet ring 19 or a press rivet nut 20 to the tightening angles 15, 16.

The press rivet ring 19 and the press rivet nut 20 accept a tightening bolt 21 for tightening the pipe connector clamp 10. The press rivet ring 19 guides the tightening bolt 21 and a thread is configured within the press rivet nut 20 into which the tightening bolt 21 can be screwed.

Figure 2:
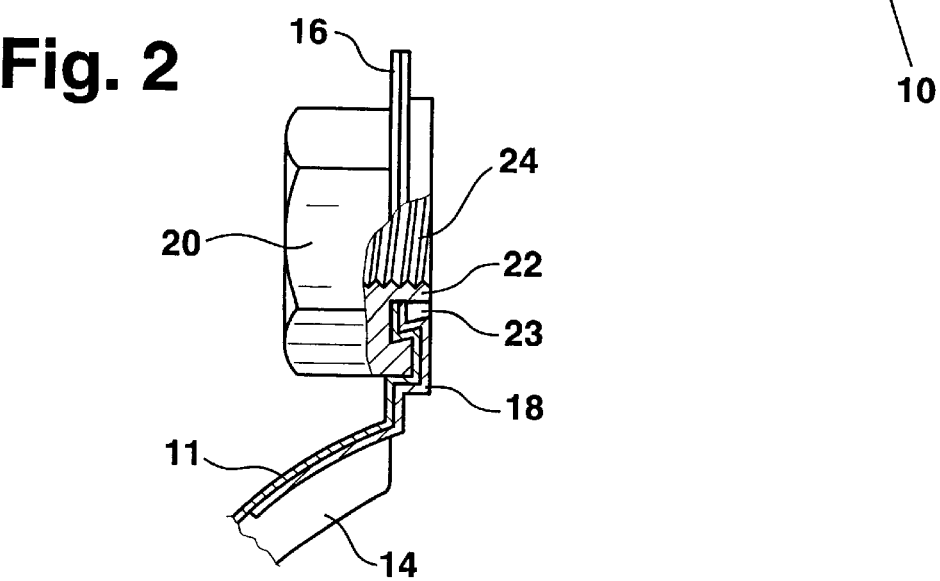
FIG. 2 shows an enlarged section of a pipe connector clamp in accordance with the invention in the vicinity of a press rivet nut of FIG. 1.

FIG. 2 shows an enlarged, partially cut view, of the pipe connector clamp of FIG. 1 in the region of press rivet nut 20. The tightening angle 16 is bent, as a single piece, out of the metal jacket 11 and the tightening angle 16 is supported from below by means of reinforcement angle 18. One end of the reinforcement angle 18 engages below the metal jacket 11. This section of the reinforcement angle 18 is bordered at both sides by the edge 14.

The press rivet nut 20 or the press rivet ring 19 of FIG. 1 are connected to the tightening angle 16 or to the reinforcement angle 18 by pressing the press rivet nut 20 against the tightening angle 16. A counter-supporting surface, not shown in the figure, thereby supports the reinforcement angle 18 and the tightening angle 16. The press rivet nut 20 is pressed against the tightening angle 16 with an amount of force which is sufficient for shoulder 22 of the press rivet nut 20 to push through the tightening angle 16 and the reinforcement angle 18. A groove 23 is configured on one side of the press rivet nut 20 and has a dove-tailed cross-section. By means of the counter supporting surface, e.g. a bottom die, tightening angle 16 and reinforcement angle 18 materials in this region are pressed into the groove 23. The press rivet nut 20 or the press rivet ring 19 are riveted to the tightening angle 15, 16 and the reinforcement angle 17, 18 in one processing step. A thread 24 of the press rivet nut 20 can accept the threaded section of a tightening bolt.

Figure 3:
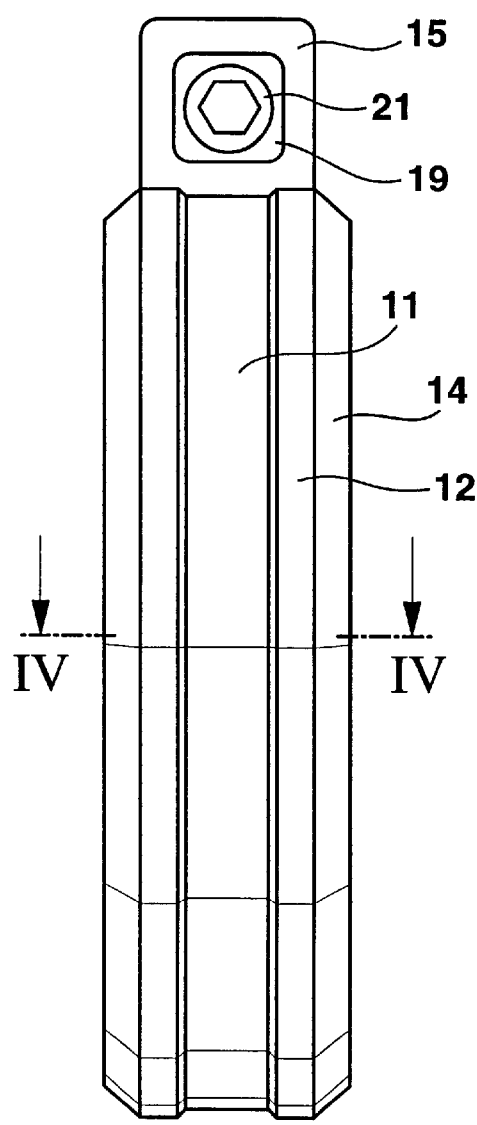
FIG. 3 shows a side-view of a pipe connector clamp in accordance with the invention.

FIG. 3 shows a side-view of the pipe connector clamp of FIG. 1. The metal jacket 11 has a contour 12 which maps into a bent-over edge 14 in each side-region. The tightening angle 15 supports the press rivet ring 19 and the press rivet ring 19 surrounds the press rivet nut 21.

Figure 4:
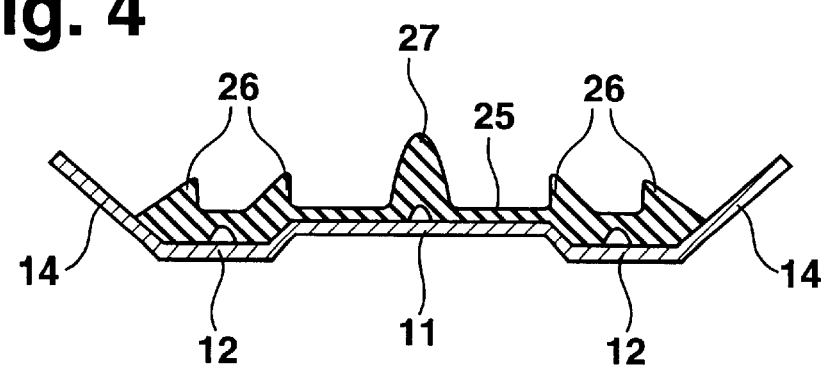
FIG. 4 shows a cross-section in accordance with IV—IV of FIG. 3.

FIG. 4 shows the pipe connector clamp in cut IV—IV of FIG. 3. This cross-sectional view demonstrates the contouring 12 on the metal jacket 11 adjacent, in each case, to the edge 14. The elastomer seal 25 inserted into the metal jacket 11 can be made from rubber or from a rubber-elastic material. The elastomer seal 25 has sealing lips 26 and spacer lips 27. The sealing lips 26 have a semi-circular cross-section or are triangular-shaped and the spacer lips 27 prevent a vibrational transfer between the pipes connected to each other by the pipe connector clamp. The elastomer seal 25 has an outer shape substantially adapted to that of the metal jacket 11.

Figure 5A:
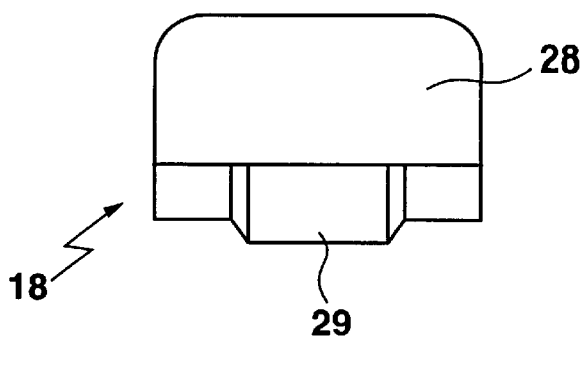
FIG. 5a shows a reinforcement angle which can be introduced in the vicinity of a tightening angle of the pipe connector clamp in accordance with the invention.
Figure 5B:
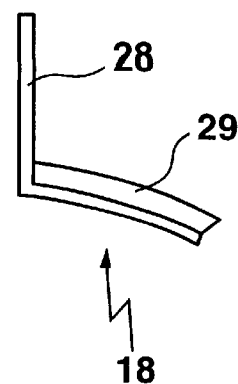
Figure 6A:
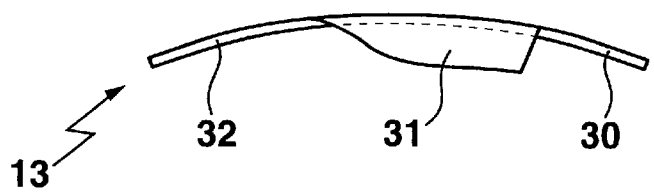
FIG. 6a shows a connecting bridge of a pipe connector clamp in accordance with the invention.
Figure 6B:
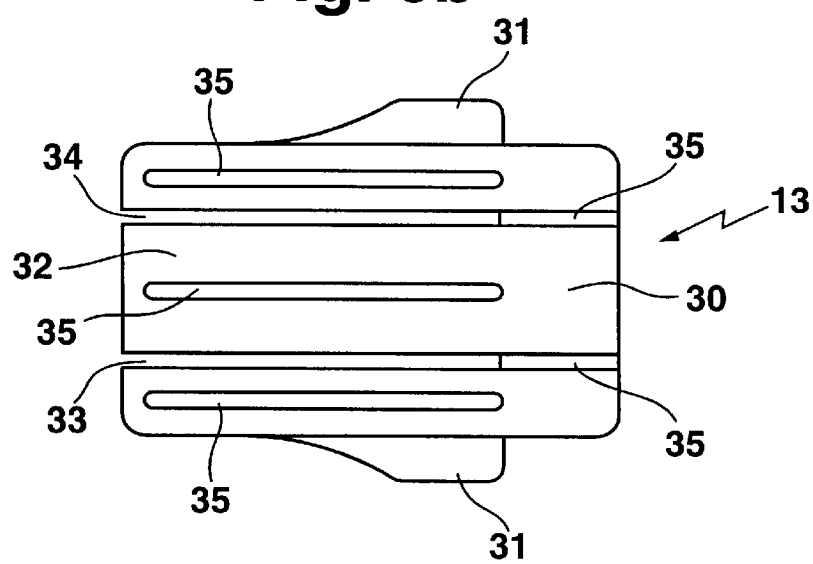

FIG. 5a shows a reinforcement angle 18 having a reinforcement surface 28 and a contoured section 29. The contoured section 29 is adapted to the contour of the metal jacket of the pipe connector clamp in accordance with the invention. FIG. 5b shows a side-view of the reinforcement angle 18. The contoured section 29 is connected to the metal jacket and the reinforcement surface 28 is adjacent to the tightening angle. FIG. 6a shows a connecting bridge 13 as illustrated in FIG. 1. The connecting bridge 13 is connected to the metal jacket of the pipe connector clamp via an end section 30. The end section 30 is adjacent to an edge section 31 which is tapered in its further extension in such a fashion that it terminates in a tongue 32 having the material thickness of the end section 30. FIG. 6b shows a plan view of the connecting bridge 13. The connecting bridge 13 has cuts 33, 34 along a certain length of the connecting bridge 13. In addition, crimps 35 are disposed on the connecting bridge 13 which could be protrusions or depressions. The connecting bridge 13 is securely connected to the pipe connector clamp via the end section 30.

A pipe connector clamp 10 for connecting two pipes having smooth ends has a metal jacket 11 comprising a tightening angle 15, 16 at a separation line of the metal jacket 11 disposed about its girth. The tightening angles 15, 16 are supported from below by reinforcement angles 17, 18. A press rivet nut 20 or a press rivet ring 19 hold the tightening angle 15, 16 and the reinforcement angle 17, 18 together via a rivet connection of the tightening angle 15, 16 and the reinforcement angle 17, 18 to the press rivet nut 20 or the press rivet ring 19. The riveted mounting of the press rivet nut 20 or the press rivet ring 19 facilitates simplified manufacture of the pipe connector clamp 10.

I claim:

1. A pipe connector clamp for connecting two pipes having smooth ends using a tightening bolt, the clamp comprising:

a C-shaped metal band having an open location, said band having a first tightening angled section extending in a radially outward direction at a first side of said open location, said first angled section having a first opening, and a second tightening angled section extending in a radially outward direction at a second side of said open location, said second angled section having a second opening, said band having a first edge and a second edge opposite said first edge, said first and second edges both extending radially towards a pipe axis;

a nut, means on said nut and said first tightening angled section for press riveting said nut within said first opening, said nut having a thread for accepting a threaded portion of the tightening bolt;

a ring, means on said ring and said second tightening angled section for press riveting said ring within said second opening, said ring having an opening for passing a shaft of the tightening bolt; and a connecting bridge disposed between said first and said second tightening angled sections, said bridge having an edge section extending radially towards a pipe axis which tapers in its radial extension along that section of said connecting bridge which slides below an edge of an oppositely lying portion of said metal-band when the clamp is tightened.

2. The pipe connector clamp of claim 1, further comprising at least one reinforcement angled member for securing at least one of said first and said second tightening angled sections, said member having a third opening aligned with one of said first and said second openings.

3. The pipe connector clamp of claim 2, wherein said reinforcement angled member is integrally connected to said metal band.

4. The pipe connector clamp of claim 2, wherein said nut connects said first tightening angled section and said reinforcement angled member to each other via press riveting within said third opening.

5. The pipe connector clamp of claim 2, wherein said ring connects said second tightening angled section and said reinforcement angled member to each other via press riveting within said third opening.

6. The pipe connector clamp of claim 2, wherein said reinforcement angled member is one of welded, riveted and clamped to the metal band in the vicinity of an end section.

7. The pipe connector clamp of claim 2, wherein said reinforcement angled member is connected to said metal band at a weldment.

8. The pipe connector clamp of claim 7, wherein said connecting bridge is connected to said metal band at said weldment.

9. The pipe connector clamp of claim 1, wherein said connecting bridge has slots extending along a portion of its length in a peripheral direction of the clamp.

10. The pipe connector clamp of claim 1, wherein said connecting bridge has crimps extending in a peripheral direction of the clamp.

* * * * *